US006831947B2

(12) United States Patent
Ribas Corbera

(10) Patent No.: US 6,831,947 B2
(45) Date of Patent: Dec. 14, 2004

(54) ADAPTIVE QUANTIZATION BASED ON BIT RATE PREDICTION AND PREDICTION ERROR ENERGY

(75) Inventor: Jordi Ribas Corbera, Redmond, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 697 days.

(21) Appl. No.: 09/816,983

(22) Filed: Mar. 23, 2001

(65) Prior Publication Data

US 2002/0181583 A1 Dec. 5, 2002

(51) Int. Cl.[7] .............................................. H04N 7/12
(52) U.S. Cl. ................ 375/240.03; 382/239; 348/404.1
(58) Field of Search ...................... 375/240.03, 240.12, 375/240.24, 240.22, 240.26, 245; 382/239, 242, 266, 236; 348/404.1, 407.1, 424.1, 390.1, 403.1

(56) References Cited

U.S. PATENT DOCUMENTS

| | | | |
|---|---|---|---|
| 4,710,812 A | | 12/1987 | Murakami et al. |
| 5,214,507 A | * | 5/1993 | Aravind et al. .......... 348/390.1 |
| 5,231,484 A | | 7/1993 | Gonzales et al. |
| 5,481,309 A | | 1/1996 | Juri et al. |
| 5,559,557 A | | 9/1996 | Kato |
| 5,724,097 A | | 3/1998 | Hibi et al. |
| 5,729,294 A | | 3/1998 | Linzer et al. |
| 5,802,213 A | * | 9/1998 | Gardos ........................ 382/239 |
| 5,847,766 A | * | 12/1998 | Peak ...................... 375/240.24 |
| 5,861,923 A | | 1/1999 | Yoon |
| 5,870,145 A | | 2/1999 | Yada et al. |
| 5,909,250 A | | 6/1999 | Hardiman |
| 5,933,194 A | * | 8/1999 | Kim et al. ............... 348/403.1 |
| 5,943,447 A | | 8/1999 | Tkhor et al. |
| 5,946,421 A | | 8/1999 | Kim |
| 5,990,957 A | | 11/1999 | Ryoo |
| 6,683,911 B1 | * | 1/2004 | Inoue ..................... 375/240.26 |

OTHER PUBLICATIONS

Atul Puri and R. Aravind, Motion–Compensated Video Coding with Adaptive Perceptual Quantization, IEEE Transactions on Circuits and Systems for Video Technology, vol. 1, No. 4, pp. 351–361, at least as early as Dec. 1991.
MPEG2 Test Model 5, doc. ISO/IEC JTC1/SC29 WG11/93–400, at least as early as Apr. 1993.
Anwar Sultan, Haniph A. Latchman, Adaptive Quantization Scheme for MPEG Video Coders Based on HVS (Human Visual System), Digital Video Compression: Algorithms and Technologies, Proc. SPIE, vol. 2668, pp. 181–188, San Jose, at least as early as Feb. 1996.
Soon Hie Tan, Khee K. Pang, King N. Ngan, Classified Perceptual Coding with Adaptive Quantization, IEEE Transactions on Circuits and Systems for Video Technology, vol. 6, No. 4, pp. 375–388, at least as early as Aug. 1996.
Nam Ik Cho, Heesub Lee, and Sang Uk Lee, An Adaptive Quantization Algorithm for Video Coding, IEEE Transactions on Circuits and Systems for Video Technology, vol. 9, No. 4, pp. 527–535, at least as early as Jun. 1999.

* cited by examiner

Primary Examiner—Gims Philippe
(74) Attorney, Agent, or Firm—Karen Dana Oster

(57) ABSTRACT

A method for adaptive quantization of video frames based on bit rate prediction that includes increasing quantization in sectors of a video frame where coding artifacts would be less noticeable to the human visual system and decreasing quantization in sectors where coding artifacts would be more noticeable to the human visual system. In one embodiment the method reverts to uniform quantization for video frames in which adaptive quantization would require extra bits.

27 Claims, 3 Drawing Sheets

ADAPTIVE QUANTIZATION BASED ON BIT RATE PREDICTION AND PREDICTION ERROR ENERGY

BACKGROUND OF THE INVENTION

The present invention is directed to methods and apparatuses for digitally encoding a video signal using an adaptive quantization technique that optimizes perceptual video quality while conserving bits. The present invention could be applied to any video coding application in which quantization can be modified within a video frame.

The MPEG Standard

The Motion Picture Experts Group ("MPEG") has standardized a syntax for the coded representation of video. Only the bit stream syntax for decoding is specified. This leaves flexibility for designing encoders, which may optimize performance by adding sophistication. The MPEG standard also allows for compromise between optimizing image quality and conserving a low bit rate.

The MPEG video bit stream syntax provides a tool called the quantization parameter ("QP") for modulating the step size of the quantizer, or data compressor. In typical video coding, the quality and bit rate of the coded video are determined by the value of the QP selected by the encoder. Coarser quantization encodes a given video scene using fewer bits but reduces image quality. Finer quantization uses more bits to encode a given video scene, with the goal of increasing image quality. Often, the quantization values can be modified within a video frame. For example, in MPEG (1, 2, 4) and H.263, there is a QP for each 16×16 image block (or macroblock) of the video scene.

Human Visual System As a Factor for Achieving Subjective Image Quality

Early digital image compression techniques sought to transmit an image at the lowest possible bit rate and yet reconstruct the image with a minimum loss of perceived quality. These early attempts used information theory to minimize the mean squared error ("MMSE"). But the human eye does not perceive quality in the mean squared error sense, and the classical coding theory of MMSE did not necessarily yield results pleasing to the human eye. Further, classical MMSE theory applied to the human enjoyment of moving video scenes did not yield pleasing results.

For certain wavelengths, the human eye can see a single photon of light in a dark room. This sensitivity of the human visual system ("HVS") also applies to quantization noise and coding artifacts within video scenes. The sensitivity of the HVS changes from one part of a video image to another. For example, human sensitivity to quantization noise and coding artifacts is less in the very bright and very dark areas of a video scene (contrast sensitivity). In busy image areas containing high texture or having large contrast or signal variance, the sensitivity of the HVS to distortion decreases. In these busy areas, the quantization noise and coding artifacts get lost in complex patterns. This is known as a masking effect. In smooth parts of an image with low variation, human sensitivity to contrast and distortion increases. For instance, a single fleck of pepper is immediately noticeable and out of place in a container of salt. Likewise, a single nonfunctioning pixel in a video monitor may be noticeable and annoying if located in a visually uniform area in the center of the monitor's working area, but hardly noticeable at all if lost in the variegated toolbars near the edges.

The objectionable artifacts that occur when pictures are coded at low bit rates are blockiness, blurriness, ringing, and color bleeding. Blockiness is the artifact related to the appearance of the 8×8 discrete cosine transform grid caused by coarse quantization in low-detail areas. This sometimes causes pixelation of straight lines. Blurriness is the result of loss of spatial detail in medium-textured and high-textured areas. Ringing and color bleeding occur at edges on flat backgrounds where high frequencies are poorly quantized. Color bleeding is specific to strong chrominance edges. In moving video scenes, these artifacts show as run-time busyness and as dirty uncovered backgrounds. Significant artifacts among frames can result in run-time flicker if they are repetitive.

The local variance of a video signal is often noticeable to the HVS on a very small scale: from pixel to pixel or from macroblock to macroblock. This means that ideally the quantization step size should be calculated for each macroblock or other small subunit of area ("sector") in a video frame. Accordingly, the quantization step size should be directly proportional to variance or some other measure of activity in each macroblock or sector.

Adaptive Versus Uniform Quantization

Previously, inventors have used the following two approaches for selecting the values of the QPs: uniform quantization and adaptive quantization.

The uniform quantization method chooses the same (or nearly the same) QP for all the macroblocks in a frame. As a result, quantization noise and coding artifacts caused by the compression of data are uniformly distributed throughout the frame.

The adaptive quantization approach permits different sectors in a video scene to be coded with varying degrees of data compression and therefore varying degrees of fidelity. This approach varies the value of the QP so that the quantization noise is distributed according to at least one property of the HVS. The goal of adaptive quantization is to optimize the visual quality of each video scene and the visual quality from video scene to video scene, while conserving storage bits by keeping the bit rate low. For example, since the human eye is less sensitive to quantization noise and coding artifacts in busy or highly textured sectors, the QP can be increased, resulting in coarser quantization and a lower bit rate requirement in busy regions. Since the human eye is more sensitive to quantization noise and coding artifacts in flat or low-textured sectors, the QP may be decreased to maintain or improve video quality, resulting in finer quantization but a higher bit rate requirement.

Although the MPEG standard allows for adaptive quantization, algorithms containing rules for the use of adaptive quantization to improve visual quality are not prescribed in the MPEG standard. As a result, two encoders may use completely different adaptive quantization algorithms and each still produce valid MPEG bit streams. MPEG2 test model 5 ("TM5") is one such adaptive quantization approach that seeks to provide an improved subjective visual quality according to characteristics of the HVS, such as spatial frequency response and visual masking response.

A common problem with some adaptive quantization approaches is that, although they may improve the visual quality in some regions of a video scene, they may also reduce the quality in others. For example, if the number of extra bits needed to refine the detail in some regions of a video scene is fairly high, the number of allotted bits for the remaining regions can be too small, and the quantization noise and coding artifacts in the latter can become quite noticeable and annoying.

Additionally, some macroblocks may contain smooth textures that are difficult to encode because they are poorly predicted, while others may contain highly textured regions that are well predicted and easy to encode. Known methods do not take this into account when adapting the QP.

Description of the Prior Art

Exemplary previous methods that attempt to adapt quantization for each macroblock so that the visual quality perceived by the HVS is uniform throughout the frame are described by the following nonpatent references: "Motion-Compensated Video Coding With Adaptive Perceptual Quantization," by Puri and R. Aravind; "Adaptive Quantization Scheme For MPEG Video Coders Based on HVS (Human Visual System)," by Sultan and H. A. Latchman; "Classified Perceptual Coding With Adaptive Quantization," by S. H. Tan, K. K. Pang, and K. N. Ngan; and "A Simple Adaptive Quantization Algorithm For Video Coding," by N. I. Choo, H. Lee, and S. U. Lee. The methods described by these references each suffer from at least one drawback. All the methods in the above references classify macroblocks according to texture content, but do not take into account the effect of prediction accuracy on bit rate. Some macroblocks are predicted accurately and require few bits to be encoded, but others of similar texture are not predicted accurately and may require many bits to be encoded. This variability in the bit requirements for similarly textured macroblocks should be one factor in calculating the magnitude of the QP. These methods fail to economize the bit cost and in some sectors of a video scene waste bits without significantly improving video quality. Further, some of the methods are not appropriate for one-pass video coding. And several of the methods use uncommon means for measuring the texture of macroblocks. This complicates the design of hardware encoders and is difficult to implement in programmable LSI chips.

Patent references directed to adaptive quantization do not describe a satisfactory method that saves bit cost and is easy to implement.

U.S. Pat. No. 4,710,812 to Murakami et al., entitled "Interframe Adaptive Vector Quantization Encoding Apparatus and Video Encoding Transmission Apparatus," and U.S. Pat. No. 5,861,923 to Yoon, entitled "Video Signal Encoding Method and Apparatus Based on Adaptive Quantization Technique," for example, do not take into account the number of bits required by each class of macroblock. The methods in these two references can easily produce drops in image quality, for example, by reducing the quantization step size in flat macroblocks. If there are no high-textured macroblocks and there are many flat macroblocks, the flat macroblocks will consume many bits, and then few bits will be left over for the medium-textured macroblocks, thereby producing noticeable quantization noise and coding artifacts.

U.S. Pat. No. 5,481,309 to Juri et al., entitled "Video Signal Bit Rate Reduction Apparatus Having Adaptive Quantization," and U.S. Pat. No. 5,231,484 to Gonzales et al., entitled "Motion Video Compression System With Adaptive Bit Allocation and Quantization," both suggest adapting the quantization step size for sectors of a video scene that are less sensitive to the human eye. But in these two references, video quality can be lost because the methods do not adapt the QP based on prediction error energy.

U.S. Pat. No. 5,990,957 to Ryoo, entitled "Video Signal Bit Amount Control Using Adaptive Quantization," is directed to a method in which the QP is adapted according to some aspects of human visual sensitivity. But the technique requires a pre-analysis and is not suitable for one-pass encoders.

BRIEF SUMMARY OF THE INVENTION

The present invention is directed to a one-pass method for digitally encoding a video signal using an adaptive quantization technique that optimizes perceptual video quality while conserving bits. The present invention could be applied to any video coding application in which quantization can be modified within a video frame.

The present invention encodes a video frame by increasing quantization in sectors of the video frame where quantization noise and coding artifacts are less noticeable to the human visual system and decreases quantization in sectors where quantization noise and coding artifacts are more noticeable to the human visual system. Surplus bits obtained from increasing quantization are preferably used to perform the step of decreasing quantization in flat sectors. In a preferred embodiment, uniform quantization is maintained if increasing quantization and decreasing quantization would require more bits than maintaining the uniform quantization.

In another variation, the present invention predicts whether there are sufficient busy sectors to make adaptive quantization of a particular video frame effective by determining whether the number of bits that would be required to encode the flat sectors using a decreased quantization parameter could be supplied by the predicted surplus bits provided by encoding all busy sectors of the video frame using an increased quantization parameter.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
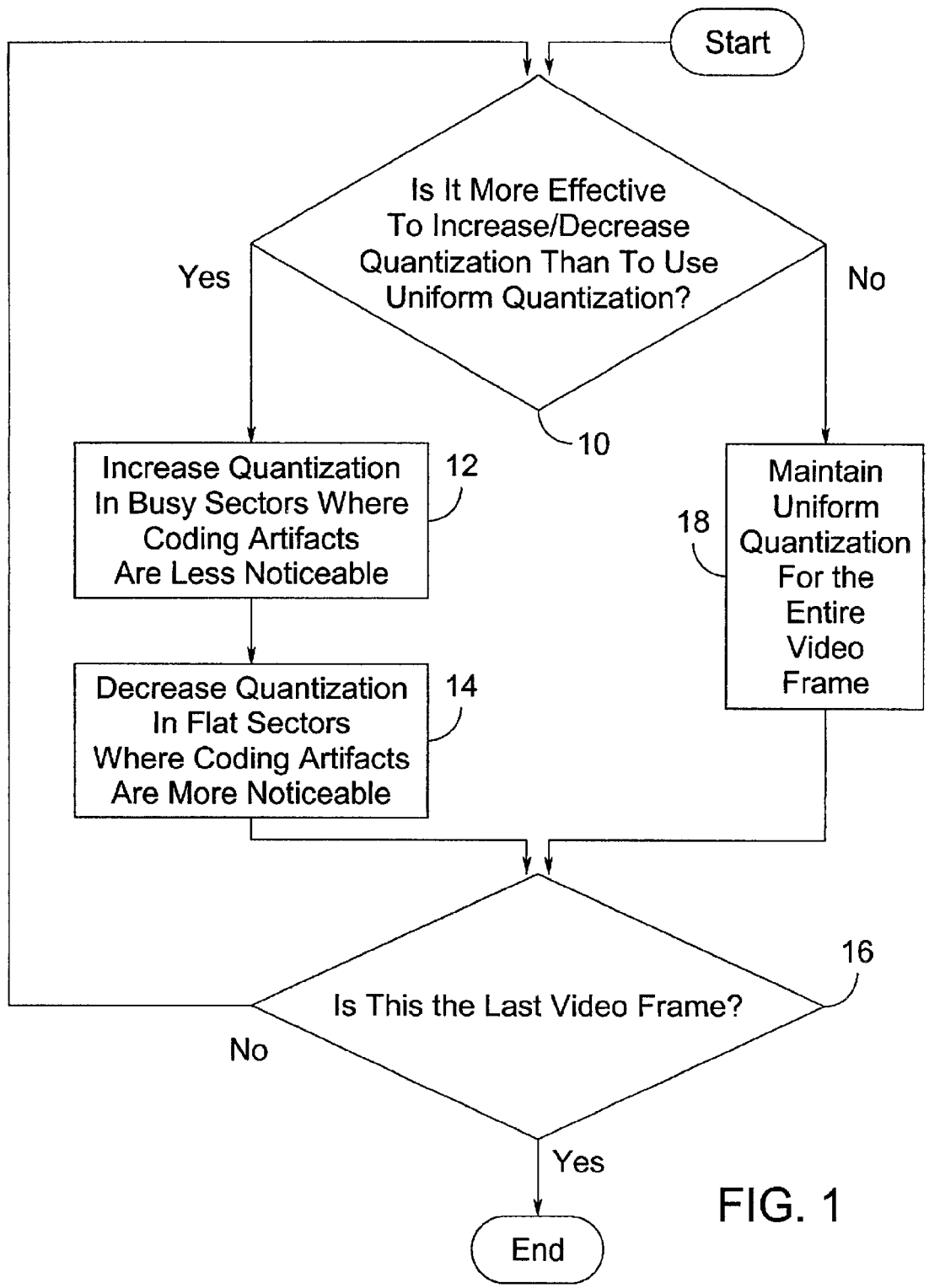
FIG. 1 is a flowchart of a preferred-method embodiment of the present invention showing the decision whether to use adaptive quantization for a given video frame in a video frame sequence.

The present invention presents effective and simple one-pass adaptive quantization techniques executable by video encoders. The methods of the present invention were developed in the context of Sharp's MPEG2 LSI video codec. This technology, however, may be applied to any video coding application in which quantization can be modified within a frame. Preferred embodiments use one-pass encoding although alternate embodiments may use more than one-pass.

The present invention overcomes prior art drawbacks by introducing bit rate prediction into adaptive quantization. The present invention calculates the impact that quantization changes have on the bit rate required to encode a video frame and adjusts the QPs for macroblocks within a frame accordingly. More specifically, the present invention makes use of steps from the following novel technique:

1. The QP is decreased in flat, low-textured sectors that can be encoded in more detail with a relatively small increase in bits.

2. The QP is increased in busy, high-textured sectors where a loss of detail is less noticeable to the human eye, only when the predicted savings of freed bits results in a relatively large surplus.

3. If the number of extra bits required to refine details in all low-textured sectors of a frame is larger than the surplus number of freed bits obtained from reducing details in all busy sectors of a frame, adaptive quantization is turned off for that video frame.

Experimentally, the adaptive quantization methods of the present invention either produce image quality that equals or surpasses that of pure uniform quantization or else save up to approximately 40 to 45 percent in bit rate cost if image quality is held constant.

The novel technique listed above is based on the following ideas: that the QP should be increased only if it will save a relatively large number of bits; otherwise, increasing the QP is a waste of bit overhead and risks image quality. Also, the QP should be decreased only if the decrease will cost few additional bits to add more detail, since it is not effective to improve the visual quality of a single macroblock when the bit cost is very high. Since the QP is increased or decreased only in the specific circumstances just listed, there will be many circumstances in which the QP is not adapted for every macroblock, and uniform quantization is used as a default. The present invention combines the novel technique listed above into method embodiments that adaptively increase or decrease the QPs for macroblocks in a video frame, reverting to a uniform QP if selected conditions such as those discussed above are not met.

It should be noted that turning off adaptive quantization for specific video frames in response to certain conditions (and temporarily reverting to uniform quantization) is itself adaptive. But for the sake of clarity, this temporary reversion to uniform quantization will be described as "the adaptive quantization method turning adaptive quantization on and off" or "adaptive quantization turning itself on and off."

| | Definitions |
|---|---|
| AAC | Absolute sum of AC values in a macroblock. |
| AC | Activity Coefficient |
| $Act_{MAX}$ | Maximum value of the variances of the subblocks in a macroblock. |
| $Act_{MIN}$ | Minimum value of the variances of the subblocks in a macroblock. |
| $B_{OVER}$ | The number of bits overspent by decreasing the quantization step size Q in the set of flat macroblocks of a video frame. |
| $B_{SAVED}$ | The number of bits saved by increasing the quantization step size Q in the set of busy macroblocks of a video frame. |
| BestAE | Sum of absolute values for the prediction error of a macroblock. |
| Bit Cost | The number of bits required to perform a function. |
| Busy Sector | At least one macroblock or contiguous macroblocks in a video scene portraying a video image with high-texture, complex pattern, or irregular edges. |
| DCT | Discrete Cosine Transform. A mathematical algorithm which is used to generate frequency representations of a block of video pixels. |
| Decreased Quantization | Decreased data compression requiring more bits or a higher bit rate for encoding a video sector, and typically providing greater visual detail. |
| $E_{AQ}$ | Square root of energy value for a macroblock. |
| $E_{BUSY}$ | Sum of energies of busy macroblocks. |
| $E_{FLAT}$ | Sum of energies of flat macroblocks. |

| | -continued |
|---|---|
| | Definitions |
| $E_{RAT}$ | Updated or filtered value of $E_{FLAT}/E_{BUSY}$. |
| $E_{RAT-10}$ | Filtered ratio of $E_{FLAT}$ and $E_{BUSY}$ (multiplied by 10). |
| Flat Sector | At least one macroblock or contiguous macroblocks in a video scene portraying a video image with low-texture or smooth edges. |
| Increased Quantization | Increased data compression requiring fewer bits or a lower bit rate for encoding a video sector, and typically providing less visual detail. |
| $K_B$ | A parameter that depends on the set of busy macroblocks in a video frame. |
| $K_F$ | A parameter that depends on the set of flat macroblocks in a video frame. |
| LSI | Large scale integration. |
| Macroblock | A 16 × 16 pixel area of a video frame |
| Mbtype | Type of a macroblock (inter or intra). |
| Q | Quantization step size. |
| QP | Quantization parameter that indicates the quantization step size for the current macroblock. It is used by H.263 and MPEG. |
| $Q_{VBR}$ | Base, default, or uniform QP used for the frame, e.g., from an encoder's VBR rate control circuit. |
| Sector | At least one macroblock or contiguous macroblocks in a video scene portraying video images with similar visual characteristics. |
| Subblock | An 8 × 8 pixel area of a macroblock. |
| $T_{BUSY}$ | An arbitrary threshold value for $Act_{MIN}$, above which a macroblock may be classified as busy. |
| $T_{FLAT}$ | An arbitrary threshold value for $Act_{MAX}$, below which a macroblock may be classified as flat. |

The methods of the present invention are directed to video encoding that may avoid problems encountered by the previous art. The adaptive quantization methods of the preferred embodiments achieve higher video image quality at lower bit rate cost by preferably combining and interconnecting three steps: quantization reduction in flat, low bit rate macroblocks; quantization increase in busy, high bit rate macroblocks; and substitution of uniform quantization instead of the above two steps if there are insufficient busy macroblocks in a video frame. The interrelation of these three steps will be explained using the flowcharts in FIGS. 1–3 and then will be explained mathematically.

FIG. 1 emphasizes the decision between adaptive quantization and uniform quantization 10. If it is more effective to increase and decrease quantization in a video frame, because an increase in video quality will not require more bits than uniform quantization, then the method will increase quantization in busy sectors 12 and decrease quantization in flat sectors 14. This is because quantization noise and coding artifacts are less noticeable in busy sectors and more noticeable in flat sectors. If it is not more effective to use adaptive quantization for a given video frame, usually because there are not enough busy sectors to yield a surplus of extra bits for decreasing quantization in flat sectors, then the method maintains uniform quantization for the entire video frame 18. When a video frame has been entirely encoded, the method checks to see if the frame was the last in the video sequence 16. If it is not the last frame, then the method processes the next frame in the sequence.

Figure 2:
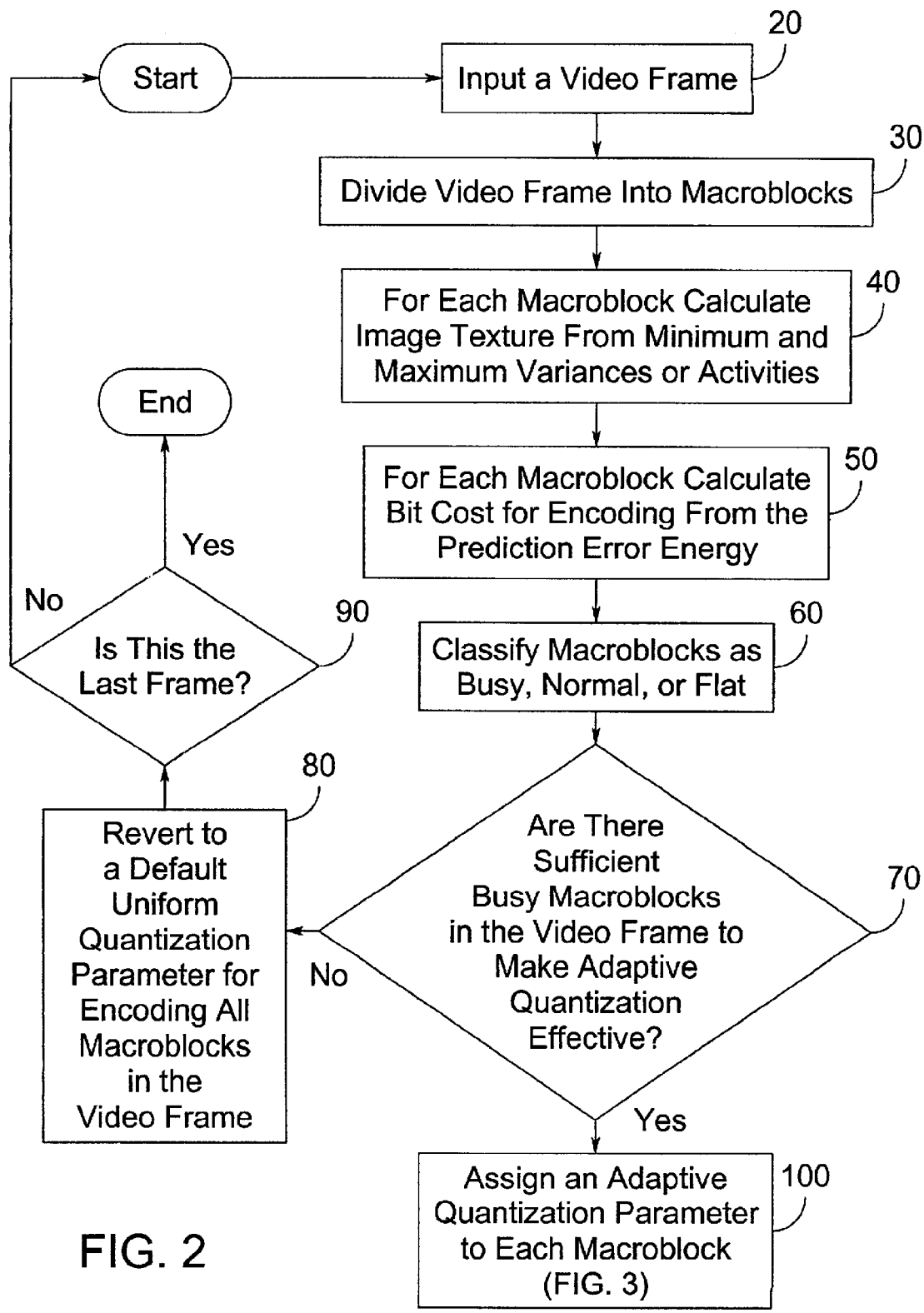
FIG. 2 is a flowchart of a preferred-method embodiment of the present invention showing selection of video frames with sufficient busy sectors to drive adaptive quantization.

FIG. 2 shows how the present invention preferably determines quantization parameters during the encoding of a series of video frames such as MPEG video frames. Specifically, FIG. 2 shows a preferred method of deciding whether to quantize a particular complete video frame using adaptive quantization parameters or whether to default to a uniform quantization parameter for all the macroblocks in that particular video frame. At the start, the encoder inputs a video frame 20, and optionally, divides the video frame into macroblocks 30 as the basic unit to be quantized. The image texture for each macroblock may then be calculated from the minimum and maximum variances or activities of subblocks within a macroblock 40. The bit cost for encoding each macroblock is preferably calculated or predicted from a prediction error energy formula 50. Each macroblock may then be classified as busy, normal, or flat 60.

Next, a calculation may be made as to whether there are enough busy macroblocks in a video frame to make adaptive quantization effective 70. There are enough busy macroblocks to make adaptive quantization effective if the bit cost savings from increasing the quantization parameter in all the busy macroblocks of a video frame frees enough bits to permit reduced quantization and higher resolution (requiring more bits) in all the normal and/or flat macroblocks of a video frame. On the other hand, there are not enough busy macroblocks to justify adaptive quantization if improvements in video quality cannot be enabled by surplus bits freed by increasing quantization in all the busy macroblocks of a video frame.

The adaptive quantization method of a preferred embodiment preferably turns itself off for a video frame when adaptive quantization would require more bits than uniform quantization for that video frame, i.e., when adaptive quantization cannot pay for itself in bit cost. Accordingly, a preferred embodiment applies adaptive quantization to video sequences that contain a large percentage of busy sectors 70, 100 but may apply uniform quantization to video sequences that lack a large percentage of busy sectors 70, 80.

Figure 3:
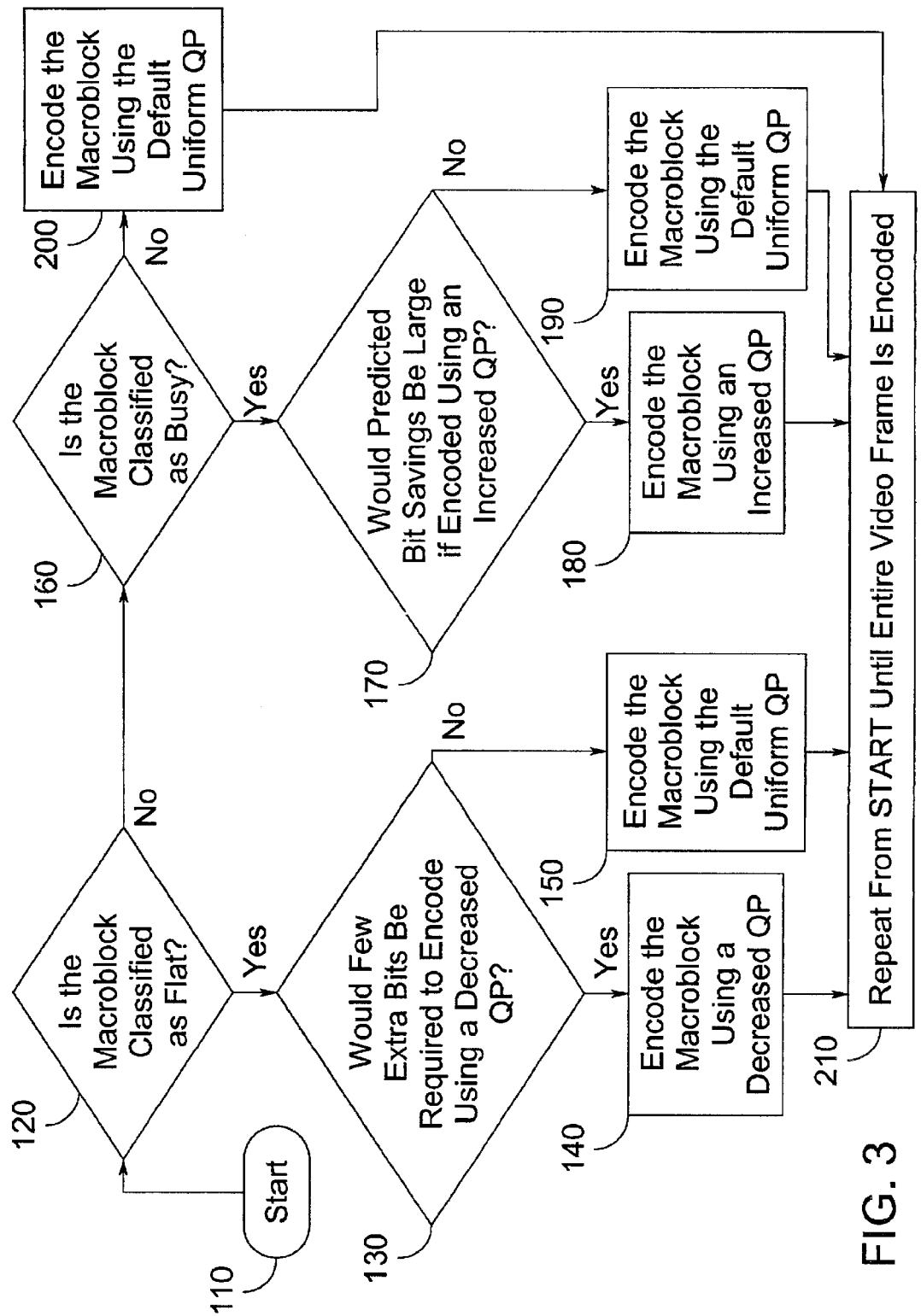
FIG. 3 is a flowchart of a preferred-method embodiment of the present invention showing assignment of a QP to each macroblock in a video frame selected by the method shown in FIG. 2.

FIG. 3 shows an exemplary embodiment of how an encoder may assign adaptive quantization parameters to the macroblocks in a video frame in which there are sufficient busy macroblocks to make adaptive quantization effective. A macroblock may be classified, for example, as busy, normal, or flat 120. In one variation this classification may be obtained from the previous tallying of macroblocks for the whole video frame (60 in FIG. 2). If the macroblock being processed is classified as flat, then the preferred method determines whether relatively few extra bits would be required to encode the macroblock using a decreased QP 130. In other words, it may not be worth a large bit cost to improve the video quality of a single macroblock. The preferred method preferably exploits opportunities to add video quality using very few extra bits. If few extra bits would be required to increase video quality in a flat macroblock where the HVS is more sensitive to quantization noise and coding artifacts, then the macroblock will be encoded using a decreased QP 140. If too many extra bits would be required to decrease the QP for a flat macroblock to achieve only a small gain in video quality, then the macroblock will preferably be encoded using the base or default QP that would be used for uniform quantization 150.

If the macroblock is classified as busy 160, then the preferred method decides whether increasing quantization using a larger QP in that macroblock would result in a relatively large surplus of freed bits 170. If the bit rate savings for increasing quantization of a busy macroblock would yield a surplus of bits, then the macroblock will be encoded using an increased QP 180. It is ineffective, however, to increase quantization in a busy macroblock if the bit rate savings to apply to video quality elsewhere in the video frame is low. Indiscriminate quantization of a busy macroblock risks the needless introduction of quantization noise and coding artifacts. If there is not substantial bit rate savings, the busy macroblock will be encoded using the base or default QP that would be used for uniform quantization 190. The determination whether there is a substantial bit rate savings may be based on any factor, including but not limited to a predetermined threshold value or, alternatively, a calculation of the bits required to encode some or all of the other macroblocks in at least one video frame.

Some variations of the preferred method encode a normal macroblock (not flat or busy), using the base or default QP that would be used for uniform quantization 200. In other variations, normal macroblocks may be adaptively quantified by a preferred embodiment's method of taking bits from sectors where the HVS is less likely to notice quantization noise and coding artifacts and using the bits taken to create greater visual detail in sectors where the HVS is more likely to notice quantization.

After a QP is assigned to a particular macroblock, the method may be repeated for each macroblock in a video frame until the entire frame is encoded 210.

Reducing Quantization in Flat, Low Bit Rate Macroblocks

As shown in FIG. 3, a preferred embodiment may decrease the quantization step size for flat macroblocks 120, 130, 140. The following is an exemplary specific method for implementing this step.

A macroblock contains 16×16 pixels and is often divided into four blocks of 8×8 pixels each. The variance in each of the four blocks may be computed as follows:

$$act_j = \frac{1}{64}\sum_{i=1}^{64}(F(i)-m)^2, \quad j=1,2,3,4 \quad (1)$$

where $act_j$ is the variance or "activity" of the j-th block in the macroblock, F(i) is the luminance value of the i-th pixel in the block, and m is the pixel average. In MPEG2, a macroblock can be split into two separate fields and so four additional blocks could be considered, i.e., j takes values between 1 and 8. $Act_{MAX}$ may be defined:

$$Act_{MAX} = \max\{act_1, act_2, \ldots, act_8\}. \quad (2)$$

In a preferred embodiment, as in prior art, a necessary condition for a block to be considered flat may be that the maximum activity $Act_{MAX}$ is below a threshold value $T_{FLAT}$.

In FIG. 3 the quantization step size will preferably be decreased only in flat sectors that are easy to code 120, 130, 140 (i.e., that will not require many additional bits). Otherwise, the bit rate cost for decreasing the step size can be too high. For example, if a macroblock is fairly flat, but is not predicted accurately (e.g., in occluded sectors of a video scene), the macroblock will require many additional bits to be encoded as compared with a well-predicted flat macroblock. If the QP were decreased, a very large number of bits would be used to encode a macroblock in which the visual benefit to the HVS would be barely noticeable.

In FIGS. 2 and 3, the predicted bit rate requirement 50 for encoding a macroblock and the determination that a macroblock is easy to encode 130, 140 may be calculated, for instance, from the relationship between the prediction error and the quantization step size. More specifically, on average, the variance of the prediction error $\sigma^2$ for a macroblock may follow the expression:

$$\sigma^2 = A\Delta^2 + \frac{Q^2}{12} + n, \quad (3)$$

where A increases with the texture of the macroblock, Δ is the motion vector accuracy (e.g., typically Δ=½ pixel), Q is the quantization step size used for encoding the macroblock's prediction, and n is unpredictable noise (e.g., camera noise, light changes, etc.).

From equation (3), it may be determined that a macroblock whose prediction error is smaller than $Q^2/12$ is usually easy to encode, i.e., such a macroblock has been predicted accurately and should use relatively few bits at the given compression level.

In Sharp's LSI, the value of the prediction error variance $\sigma^2$ is often unavailable. But the value BestAE (the sum of absolute values in the prediction error) is usually available from motion estimation. Practical experimentation shows that:

$$\frac{BestAE}{256} \cong 0.7\sigma \text{ (approximately)} \quad (4)$$

and, as a result, the condition for determining that a macroblock is easy to code, i.e., $$\sigma^2 < \frac{Q^2}{12}, \quad (5)$$

may be roughly equivalent to $$\frac{BestAE}{256} < \frac{0.7Q}{\sqrt{12}} \cong \frac{Q}{5}. \quad (6)$$

For intra macroblocks, the value of BestAE may not be relevant because these macroblocks might not be coded using a prediction. In that case, the value AAC (i.e., the sum of absolute AC coefficients in the intra DCT) may be utilized, which may also be computed in Sharp's LSI. But the value of AAC is divided by 1.4 to compensate for the fact that the intra pixels are more correlated than the inter pixels. In other words, an intra macroblock with a given AAC will typically require fewer bits for encoding than an inter macroblock with the same value for BestAE.

In summary, the process for selecting a flat macroblock for the adaptive quantization technique of the present invention can be explained by the following example:

If the macroblock is intra, set $E_{AQ}=(AAC/1.4)/256 \cong AAC/358$ else set $E_{AQ}=BestAE/256$ If $E_{AQ}<Q/5$ and $Act_{MAX}<T_{FLAT}$, the macroblock is classified as flat.

In a preferred embodiment, the quantization step size Q is typically reduced by a factor of approximately 2 (QP=Q/2) for flat macroblocks. A preferred value $T_{FLAT}=175$ may be adopted. Since this threshold value is fairly high, the main classification of macroblocks may be performed by other means, such as using the relationship between the value $E_{AQ}$ and the quantization step size Q.

Increasing Quantization in Busy, High Bit Rate Macroblocks

The human eye is less sensitive to quantization noise and coding artifacts in busy, high-textured sectors, so as shown in FIG. 3, a preferred embodiment may increase the quantization step size for busy, high-textured macroblocks 160, 170, 180. In this case, $Act_{MIN}$ may be defined:

$$Act_{MIN}=\min \{act_1, act_2, \ldots, act_8\}. \quad (7)$$

As in prior art, a macroblock is preferably defined as busy if the minimum activity $Act_{MIN}$ is above some threshold value $T_{BUSY}$.

In a preferred embodiment of the present invention, however, the quantization step size may be increased only in busy, high-textured sectors that require a relatively large number of bits to be encoded 160, 170, 180. This is to prevent even a slight risk of video quality degradation unless a significant number of surplus bits will be freed for use in other macroblocks. If a sector is highly textured but does not require a large number of bits for encoding, it may be decided to not increase the QP 160, 170, 190. For example, if the QP is increased for a textured, static (from one frame to the next) macroblock (e.g., in the background) or for a macroblock that is very well predicted, the increased QP would not free many surplus bits for use in other macroblocks. Such an ineffective increase in QP needlessly risks introducing visual errors such as quantization noise and coding artifacts and wastes bits in quantization overhead.

From equation (3), the following criterion may be adopted for deciding that a macroblock is difficult to encode:

$$\sigma^2 > 4\frac{Q^2}{12}, \quad (8)$$

which is roughly equivalent to:

$$\frac{BestAE}{256} > \frac{0.7Q}{\sqrt{12/4}} \cong \frac{2Q}{5}. \quad (9)$$

In summary, the process for selecting a busy macroblock may be explained as in the following example:

If the macroblock is intra, set $E_{AQ}=(AAC/1.4)/256 \cong AAC/358$ else set $E_{AQ}=BestAE/256$.

If $E_{AQ}>2Q/5$ and $Act_{MIN}>T_{BUSY}$, the macroblock may be classified as busy.

In a preferred embodiment, the quantization step size Q is typically increased by a factor of approximately 2 (QP=2Q) for busy macroblocks. A preferred value of $T_{BUSY}=125$ may be adopted. Since this threshold value is fairly low, the main classification of macroblocks may be performed by other means, such as using the relationship between the value $E_{AQ}$ and the quantization step size Q.

Limiting Adaptive Quantization to Video Scenes with Busy Sectors

Prior art methods almost always reduce the quantization step size Q in flat macroblocks of a video scene. This may appear to be a smart approach, since quantization noise and coding artifacts in flat macroblocks are more visible. It may also, however, produce drops in image quality. Therefore, as shown in FIG. 2, a preferred embodiment of the present invention may limit adaptive quantization to video scenes with a threshold number of busy sectors 70, 100 so that the surplus of freed bits from quantizing busy sectors can be used to add more detail to flat sectors without increasing the overall bit requirement for the entire frame.

As an exemplary comparison of the adaptive quantization method to the uniform quantization method in video scenes without busy sectors, consider two identical frames in which most of the macroblocks are flat, some are medium-textured ("normal"), but none are busy or highly textured. One of the frames will be adaptively quantified and the other identical frame will be uniformly quantified. In the adaptively quantized frame, let Q/2 and Q denote the quantization step sizes used for the flat and medium-textured macroblocks, respectively. In the uniformly quantized frame, a uniform step size Q' is used to encode both flat and medium-textured macroblocks allotting an equal number of bits for each type of macroblock. In this latter approach, Q' will take some value between Q and Q/2. In fact, Q' will be biased toward Q/2 because the uniform-Q' case does not suffer from quantization overhead.

In comparing the two identical frames encoded by these different methods, the one coded with the adaptive approach (Q/2 for flat macroblocks and Q for medium-textured macroblocks) will show some quality improvement in flat sectors over the uniformly quantized frame (since Q/2 is smaller than the corresponding Q' of the uniform step size method). The quality will be worse, however, in medium-textured sectors (since Q is larger than Q'). As a result, a human observer would not necessarily perceive one frame as having better image quality than the other, since there could be different visual artifacts in both. In fact, it is easier to introduce visible quantization noise and coding artifacts into medium-textured sectors than in low-textured sectors without the artifacts being objectionable to the human eye, and so an observer might often prefer a frame coded with the uniform Q' method. Experimentation in the development of a preferred embodiment of the present invention confirmed that when adaptive quantization is applied indiscriminately to video scenes lacking busy sectors, the quantization noise and coding artifacts throughout medium-textured sectors are quite noticeable and annoying.

Since a decrease in the quantization step size Q for flat macroblocks may degrade the image quality of medium-textured macroblocks, it is desirable to avoid decreasing the quantization step size Q for flat macroblocks unless the extra bits required to encode the flat macroblocks are provided by quantizing busy macroblocks. As shown in FIG. 2, a preferred embodiment preferably uses adaptive quantization parameters only when the surplus bits freed from increasing the quantization step size in busy sectors outnumber the additional bits spent by decreasing the step size in flat sectors 70, 100. Thus, in comparison to prior art methods that use a fixed Q for the entire frame, a preferred embodiment will ideally spend equal or fewer bits than prior art methods when encoding a video frame.

The number of bits $B_N$ for encoding macroblocks in a set N with a fixed quantization step size Q may be given by the following expression:

$$B_N = K_N \sum_N \frac{\sigma_i^2}{Q^2}, \quad (10)$$

where $\sigma_i^2$ is the prediction error variance for the i-th macroblock in the set and $K_N$ is a parameter that depends on the set. Next, let Q denote the basic step size used for the medium-textured macroblocks in a frame. The quantization step size Q may be increased for the busy macroblocks by a factor a and decreased by the same factor for the flat macroblocks. In other words, the step size used for the busy macroblocks is aQ, and the step size for the flat macroblocks is Q/a. More generally, the factor that increases quantization does not need to be the same as the one that decreases it, i.e., aQ could be used to increase quantization and Q/b could be used to decrease quantization, where a and b are not equal.

Let B denote the set of busy macroblocks. The number of bits saved by increasing the quantization step size Q in those macroblocks is approximately:

$$B_{SAVED} = K_B \sum_B \frac{\sigma_i^2}{Q^2} - K_B \sum_B \frac{\sigma_i^2}{(aQ)^2} = \frac{a^2-1}{a^2} K_B \sum_B \frac{\sigma_i^2}{Q^2}. \quad (11)$$

Similarly, let F denote the set of flat macroblocks. The number of bits overspent by decreasing the quantization step size in those macroblocks is roughly:

$$B_{OVER} = K_F \sum_F \frac{\sigma_i^2}{(Q/a)^2} - K_F \sum_F \frac{\sigma_i^2}{Q^2} = (a^2-1) K_F \sum_F \frac{\sigma_i^2}{Q^2}. \quad (12)$$

In a preferred embodiment shown in FIG. 2, adaptive quantization 70, 100 is performed only when $B_{SAVED}$ is greater than or equal to $B_{OVER}$; otherwise, preferred embodiments would suffer from drawbacks similar to those in prior art approaches. By comparing the formulas in equations (11) and (12), the following expression may be obtained:

$$B_{SAVED} > B_{OVER}, \quad (13)$$

$$\frac{a^2-1}{a^2} K_B \sum_B \frac{\sigma_i^2}{Q^2} > (a^2-1) K_F \sum_F \frac{\sigma_i^2}{Q^2},$$

$$E_{BUSY} > \frac{K_F}{K_B} a^2 E_{FLAT},$$

where $E_{BUSY}$ and $E_{FLAT}$ may be defined as follows:

$$E_{BUSY} = \sum_B E_{AQ,i}^2 \quad (14)$$

$$E_{FLAT} = \sum_F E_{AQ,i}^2.$$

$E_{AQ,i}$ is the value of $E_{AQ}$ for the i-th macroblock in the respective set. $E_{AQ}$ is either BestAE/256 or (AAC/1.4)/256, which are related to σ. A preferred conservative value of 600 may be adopted for $K_F/K_B \ a^2$. Using this conservative value, equation (13) can be expressed:

$$100 \frac{E_{FLAT}}{E_{BUSY}} < 6. \quad (15)$$

In one variation of a preferred embodiment, adaptive quantization will be performed 70, 100 only when equation (15) holds, i.e., when the number of bits saved in the busy sectors is greater than or equal to the additional bits spent in flat sectors. In some embodiments, however, the ratio at the left-hand side of equation (15) can fluctuate significantly from frame to frame, so a linear filter may be employed in some variations to smooth the fluctuation:

$$E_{RAT} = 0.8 E_{RAT} + 0.2 \cdot 100 \frac{E_{FLAT}}{E_{BUSY}}, \quad (16)$$

where $E_{RAT}$ is the updated or filtered value of the ratio in equation (15). For convenience, the two sides of equation (15) may be multiplied by 10 in order to avoid multiplying by 0.8 and 0.2 in assembly coding (as discussed in the next section). In summary, a preferred embodiment preferably performs adaptive quantization 70, 100 only when the following inequality holds:

$$E_{RAT-10} = 10 E_{RAT} < 60. \quad (17)$$

Methods of the Preferred Embodiments

From the theory in the previous sections effective methods were designed for performing adaptive quantization. In this section the methods of the preferred embodiments are described step by step. The methods have been kept simple in terms of memory and computation requirements, so that implementation can be performed with platforms such as Sharp's LSI assembly code using a minimum number of instructions. For example, the adaptive quantization could be improved by modifying some parameters according to different frame types. But in a preferred embodiment, the parameters are kept fixed for simplicity. Experimentally, a preferred method, although simplified, obtains performance gains that are close to those of more complex preferred embodiments.

In a preferred embodiment shown in FIG. 2, macroblocks may be classified 60, for example, into three classes (i.e., normal, flat, and busy) according to image texture 40 and bit cost 50. Image texture 40 may be measured in terms of block minimum and maximum variances or activities, and bit cost 50 may be estimated, for example, from prediction error energy and quantization level. A QP value is preferably decreased for flat macroblocks and increased for busy macroblocks.

In the P-RAM, variables may be set to the following parameters:

$$E_{FLAT} = E_{BUSY} = 0$$

$$E_{RAT-10} 20$$

Exemplary Step One
  Initialization before encoding the current frame.
  The filtered ratio $E_{RAT-10}$ may be updated as:

$$E_{RAT-10} = 8 \cdot E_{RAT-10} + 2 \cdot \left[ 100 \cdot \frac{E_{FLAT}}{E_{BUSY}} \right] \cong 8 \cdot E_{RAT-10} + 2 \cdot \left[ \frac{E_{FLAT}}{\max(1, E_{BUSY}/100)} \right].$$

(The second part of the equation introduces the max operator to avoid a division by zero in assembly code implementation.)
  Next, the following parameters may be initialized:

$Q_{VBR}$=Base quantization step size QP (given by the encoder's rate control circuit, e.g., from a VBR rate control technique).
  $E_{BUSY} = E_{FLAT} = 0$.
Exemplary Step Two
  $E_{AQ}$, $ACT_{MAX}$ and $ACT_{MIN}$ may be computed for the current macroblock as in this example:
    If Mbtype is intra, set $E_{AQ}$=(AAC/1.4)/256≅AAC/358 or else set
    $E_{AQ}$=BestAE/256 where:
      $ACT_{MIN}$=min {$act_1$, $act_2$, . . . , $act_8$}
      $ACT_{MAX}$=max {$act_1$, $act_2$, . . . , $act_8$}.
Exemplary Step Three
  QP may be selected for the current macroblock as in these examples:
    QP=$Q_{VBR}$
    If $E_{RAT-10}$<60, then . . .
    In the case of linear quantization, flat and busy macroblocks may be assigned a QP and the sum of energies for flat and busy macroblocks may be updated as in these examples:
      FLAT: If $E_{AQ}$<$Q_{VBR}$/5 and $ACT_{MAX}$<175
        set QP=$Q_{VBR}$/2
        $E_{FLAT} = E_{FLAT} + E_{AQ} \cdot E_{AQ}$.
      BUSY: If $E_{AQ}$>2$Q_{VBR}$/5 and $ACT_{MIN}$>125
        set QP=2$Q_{VBR}$
        $E_{BUSY} = E_{BUSY} + E_{AQ} \cdot E_{AQ}$.
    In the case of nonlinear quantization, flat and busy macroblocks may be assigned a QP and the sum of energies for flat and busy macroblocks may be updated as in these examples:
      FLAT: If $E_{AQ}$<$Q_{VBR}$/5 and $ACT_{MAX}$<175
        set QP=$Q_{VBR}$/1.5
        $E_{FLAT} = E_{FLAT} + E_{AQ} \cdot E_{AQ}$.
      BUSY: If $E_{AQ}$>2$Q_{VBR}$/5 and $ACT_{MIN}$>125
        set QP=1.5 $Q_{VBR}$
        $E_{BUSY} = E_{BUSY} + E_{AQ} \cdot E_{AQ}$.

Experimental Results Using a Preferred Embodiment in the TM5 Video Codec

The optimized adaptive quantization of a preferred embodiment of the present invention was first used in the well-known TM5 MPEG2 video codec. Exemplary experiments applied two techniques listed below to three identical video sequences and compared the results:

An adaptive quantization method using a preferred embodiment, resulting in a bit rate B for the encoded sequence.

A uniform quantization method using the same quantization step size for all macroblocks, in which the step size was modified until the same overall bit rate B was obtained as from the adaptive method above.

1. First Video Sequence of Girls Dancing

The beginning of the sequence has a background with two colors. The adaptive quantization method of a preferred embodiment reduced the quantization noise and coding artifacts in the background. In the rest of the sequence, girls are dancing. The textures in the dancing scene are very smooth, and so there is not much potential for freeing surplus bits by adaptively increasing the QP in busy, high-textured regions. In fact, the threshold conditions of having favorable busy-to-flat macroblock ratios in equations (16) and (17) are not met, and the preferred method turns off adaptive quantization for this part of the video sequence. The method turns off adaptive quantization in video scenes where there would be an extra bit rate cost. The extra bit rate cost is due to a lack of busy sectors from which to free surplus bits for use in flat sectors.

2. Second Video Sequence of Girls Dancing
(A Scene After a Lip Close-up, in which There Are Several Flashes)

In this video sequence the adaptive quantization method of a preferred embodiment reduced blocking quantization noise and coding artifacts in the faces of the girls. An interesting improvement is that a black skin mark in the face of the center dancing girl appeared and disappeared while using the uniform quantization method, but looked consistent and natural using the adaptive quantization method of a preferred embodiment.

3. Third Video Sequence of a Garden
(A Scene with Sky, Trees, Houses, and a Garden)

This scene benefited the most from use of the adaptive quantization method of a preferred embodiment because of the great variety of textures. The sky had noticeably less blocking from quantization noise and coding artifacts and the trees and houses were sharper to the human eye than those in the uniform quantization version of the same video sequence.

The bit rate of the uniform quantization method was then increased (almost doubled). This uniform quantization method using a higher bit rate was then compared to the adaptive quantization method of a preferred embodiment. To the human eye the image quality between the two methods was similar with only negligible differences (the uniform quantization method gave slightly better results in the sky portion of the video scene and slightly worse results in other portions of the scene, but the overall quality of the two video sequences otherwise appeared equivalent). This increasing of the bit rate in the uniform quantization method suggests that when the adaptive quantization method of a preferred embodiment and a uniform quantization method are equalibrated to yield video scenes of comparable quality, the adaptive quantization method of a preferred embodiment saves approximately 40 to 45 percent of the overall bit rate cost.

Summary of Experimental Results

From these and other experiments the following conclusions were derived:

Regardless of video scene, the image quality obtained by using a preferred embodiment is always as good as or better than that obtained by using prior art quantization methods.

In scenes where the textures are all smooth, there is little or no benefit obtained by using adaptive quantization. In fact, the method of a preferred embodiment detects scenes where most textures are smooth and, using the conditions in equations (16) and (17), automatically turns off adaptive quantization to avoid introducing any quantization noise and coding artifacts.

In scenes where there are a variety of textures, the method of a preferred embodiment can achieve either significant image quality improvement or, alternatively, up to approximately 40 to 45 percent bit rate savings.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A method for adaptively quantizing the encoding of a video frame, said method comprising the steps of:
   (a) selecting a first default QP value, a second higher QP value higher than said first default QP value, and a third lower QP value lower than said first default QP value;
   (b) predicting a baseline number of bits to encode said video frame using said first default QP value;
   (c) classifying portions of said video frame into busy sectors and flat sectors;
   (d) predicting whether said video frame has sufficient busy sectors to produce surplus bits over said baseline number of bits if said busy sectors are encoded using said second higher QP value;
   (e) predicting whether said surplus bits are sufficient to encode said flat sectors using said third lower QP value;
   (f) quantifying said busy sectors using said second higher QP value and said flat sectors using said third lower QP value if said video frame has said sufficient busy sectors and said surplus bits are sufficient to encode said flat sectors; and
   (g) encoding said video frame entirely using said first default QP value if encoding said video frame entirely using said first default QP value would be more efficient than quantifying said busy sectors using said second higher QP value and quantifying said flat sectors using said third lower QP value.

2. The method of claim 1 further comprising the step of repeating steps (a)–(g) for each of a plurality of video frames.

3. The method of claim 1, wherein said step of encoding said video frame entirely using said first default QP value is more efficient than said step of quantifying said busy sectors using said second higher QP value and said step of quantifying said flat sectors using said third lower QP value if said video frame does not have said sufficient busy sectors.

4. The method of claim 1, wherein said step of encoding said video frame entirely using said first default QP value is more efficient than said step of quantifying said busy sectors using said second higher QP value and said step of quantifying said flat sectors using said third lower QP value if said surplus bits are insufficient in number to encode said flat sectors.

5. The method of claim 1, wherein said step of predicting whether a video frame has sufficient busy sectors further comprises the step of setting a criterion that said video frame does have sufficient busy sectors if a predicted number of bits that would be required to encode all said flat sectors of said video frame using said third lower QP value is less than or equal to a predicted number of said surplus bits that would be provided by encoding all said busy sectors of said video frame using said second higher QP value.

6. A method for adaptive quantization of video encoding based on prediction of required bits, said method comprising the steps of:
   (a) providing a video frame;
   (b) establishing a uniform QP value for said video frame;
   (c) classifying said video frame into busy sectors, normal sectors, and flat sectors;
   (d) decreasing quantization below said uniform QP value in said flat sectors of said video frame that can be encoded with a predicted relatively small increase in said required bits needed to encode said flat sectors using a QP value below said uniform QP value;
   (e) increasing quantization above said uniform QP value in said busy sectors of said video frame only when a predicted decrease in said required bits needed to encode said busy sectors using a QP value above said uniform QP value is relatively large; and
   (f) reverting to said uniform QP value for all sectors of said video frame if a predicted number of said required bits for encoding all said flat sectors in said video frame using said QP value below said uniform QP value would be greater than a predicted number of surplus bits provided by encoding all said busy sectors in said video frame using said QP value above said uniform QP value.

7. The method of claim 6 further comprising the step of repeating steps (a)–(f) for each of a plurality of video frames.

8. The method of claim 6, said step of classifying said video frame into busy sectors, normal sectors, and flat sectors further comprising the step of classifying visual textures using high, medium, and low texture categories and a predicted required bits value for at least a portion of each sector in said video frame.

9. The method of claim 6 further comprising the step of summing an energy value for at least a portion of each sector in said video frame.

10. The method of claim 8, said step of classifying visual textures further comprising a step selected from the group of steps consisting of:
   (a) calculating said energy value for said at least a portion of each sector using at least one variance value;
   (b) calculating said energy value for said at least a portion of each sector using at least one luminance value; and
   (c) calculating said energy value for said at least a portion of each sector using at least one activity value.

11. The method of claim 8, said step of classifying visual textures further comprising the step of calculating a predicted required bits value for each sector using a prediction error energy value.

12. The method of claim 6 further comprising the step of decreasing said QP by a first constant.

13. The method of claim 6 further comprising the step of increasing said QP by a second constant.

14. A method for adaptive quantization of the encoding of a video frame based on predicted bit rate, said method comprising the steps of:
   (a) decreasing a QP by a constant in low-textured sectors of said video frame that can be encoded with a relatively small increase in said predicted bit rate;
   (b) increasing a QP by a constant in high-textured sectors of said video frame only when a decrease in said predicted bit rate is relatively large;
   (c) turning off said steps of decreasing a QP and increasing a QP if said relatively small increase in said predicted bit rate for encoding said low-textured sectors is larger than said decrease in said predicted bit rate for encoding said high-textured sectors;
   (d) selecting a constant of approximately 2.0 for linear quantization; and
   (e) selecting a constant of approximately 1.5 for nonlinear quantization.

15. A method for adaptive quantization of the encoding of a video frame based on predicted bit rate, said method comprising the steps of:
   (a) decreasing a QP in low-textured sectors of said video frame that can be encoded with a relatively small increase in said predicted bit rate;
   (b) increasing a QP in high-textured sectors of said video frame only when a decrease in said predicted bit rate is relatively large;
   (c) turning off said steps of decreasing a QP and increasing a QP if said relatively small increase in said predicted bit rate for encoding said low-textured sectors is larger than said decrease in said predicted bit rate for encoding said high-textured sectors;
   (d) providing a complete digital representation of at least one video frame encoded by said adaptive quantization to a decoder; and
   (e) displaying said at least one video frame on a display device in a decoded form.

16. The method of claim 15, said steps of decreasing a QP and increasing a QP further comprising the step of increasing and decreasing a QP by a constant.

17. A method for determining the rate of data compression for digital storage of a sequence of video frames, said method comprising the steps of:
   (a) dividing said sequence of video frames into individual video frames;
   (b) establishing a usual rate of data compression for each video frame;
   (c) dividing each video frame into sectors;
   (d) predicting a bit rate cost for digitally storing each sector;
   (e) predicting a visual complexity for each sector;
   (f) dividing said usual rate of data compression by a first constant for each sector in which said predicted visual complexity is low and said predicted bit rate cost for digitally storing is low;
   (g) multiplying said usual rate of data compression by a second constant for each sector in which said visual complexity is high and said predicted bit rate cost for digitally storing is high;
   (h) maintaining said usual rate of data compression at a nearly constant value for all sectors in said video frame if an absolute value of a predicted increase in an overall bit rate cost for digital storage of all sectors in which said predicted visual complexity is low and said predicted bit rate cost for digitally storing is low is greater than an absolute value of a predicted decrease in an overall bit rate cost for digital storage of all sectors in which said predicted visual complexity is high and said predicted bit rate cost for digitally storing is high; and
   (i) encoding each sector of each video frame in said sequence of video frames to obtain a complete digital representation of said sequence of video frames.

18. The method of claim 17 further comprising the steps of:
   (a) providing said complete digital representation of said sequence of video frames to a decoder; and
   (b) displaying said sequence of video frames on a display device in a decoded form.

19. The method of claim 17, wherein said step of predicting a bit rate cost for digitally storing each sector further comprises the steps of calculating said bit rate cost by:
   (a) determining an energy parameter for each sector;
   (b) determining a quantization step size value for each sector;
   (c) defining each sector having the square root of a value of said energy parameter less than said quantization step size value divided by a third constant as having a low bit rate cost for digital storage; and
   (d) defining each sector having the square root of a value of said energy parameter greater than said quantization step size value multiplied by a fourth constant as having a high bit rate cost for digital storage.

20. The method of claim 17, said step of predicting a visual complexity for each sector further comprising the steps of calculating said visual complexity by:
   (a) determining an activity parameter for each sector;
   (b) determining first and second threshold activity values for categorizing said visual complexity of each sector;
   (c) defining each sector having a value of said activity parameter less than or equal to said first threshold activity value as having low visual complexity;
   (d) defining each sector having a value of said activity parameter both greater than said first threshold activity value and less than or equal to said second threshold activity value as having normal visual complexity; and
   (e) defining each sector having a value of said activity parameter greater than said second threshold activity value as having high visual complexity.

21. The method of claim 17, said step of predicting a visual complexity for each sector further comprising the steps of calculating said visual complexity by:
   (a) determining a maximum activity parameter for each sector;
   (b) determining a minimum activity parameter for each sector;
   (c) determining first and second threshold activity values for categorizing said visual complexity of each sector;
   (d) defining each sector having a value of said maximum activity parameter less than or equal to said first threshold activity value as having low visual complexity;
   (e) defining each sector having a value of said maximum activity parameter greater than said first threshold activity value and a value of said minimum activity parameter less than or equal to said second threshold activity value as having normal visual complexity; and (f) defining each sector having a value of said minimum activity parameter greater than said second threshold activity value as having high visual complexity.

22. The method of claim 17, said step of maintaining said usual rate of data compression further comprising the step of calculating said increase in overall bit rate cost by summing said bit rate costs for each sector in which said predicted visual complexity is low and said predicted bit rate cost for digitally storing is low.

23. The method of claim 17, said step of maintaining said usual rate of data compression further comprising the step of calculating said decrease in overall bit rate cost by summing said bit rate costs for each sector in which said predicted visual complexity is high and said predicted bit rate cost for digitally storing is high.

24. The method of claim 17, said steps of dividing said usual rate of data compression by a first constant and multiplying said usual rate of data compression by a second constant further comprising the step of executing linear quantization.

25. The method of claim 17, said steps of dividing said usual rate of data compression by a first constant and multiplying said usual rate of data compression by a second constant further comprising the step of executing nonlinear quantization.

26. The method of claim 17, said step of maintaining said usual rate of data compression further comprising the step of filtering values of a ratio formed between said sectors with low visual complexity and said sectors with high visual complexity for each video frame so that said sequence of video frames will maintain said usual rate of data compression despite isolated fluctuations in said ratio for individual video frames.

27. An encoder for coding a digital picture in a video frame, comprising:

(a) a frame divider for dividing said video frame into sectors;

(b) a bit rate predictor for predicting a bit rate cost for digitally storing each sector;

(c) a visual complexity predictor for predicting a visual complexity for each sector;

(d) a quantization divider for dividing a usual rate of data compression by a first constant for each sector in which said predicted visual complexity is low and said predicted bit rate cost for digitally storing is low;

(e) a quantization multiplier for multiplying said usual rate of data compression by a second constant for each sector in which said visual complexity is high and said predicted bit rate cost for digitally storing is high; and (f) a quantization equalizer for maintaining said usual rate of data compression at a nearly constant value for all sectors in said video frame if an absolute value of a predicted increase in an overall bit rate cost for digitally storing all sectors in which said predicted visual complexity is low and said predicted bit rate cost for digitally storing is low is greater than an absolute value of a predicted decrease in an overall bit rate cost for digitally storing all sectors in which said predicted visual complexity is high and said predicted bit rate cost for digitally storing is high.

* * * * *

UNITED STATES PATENT AND TRADEMARK OFFICE
CERTIFICATE OF CORRECTION

PATENT NO.    : 6,831,947 B2
DATED         : December 14, 2004
INVENTOR(S)   : Corbera It is certified that error appears in the above-identified patent and that said Letters Patent is hereby corrected as shown below:

Column 11,
Line 49, "factor a" should read -- factor $a$ --;
Line 51, "aQ" should read -- $a$Q --;
Line 52, "Q/a" should read -- Q/$a$ --;
Line 54, "aQ" should read -- $a$Q --;
Line 54, "Q/b" should read -- Q/$b$ --;
Line 55, "a" should read -- $a$ --; and
Line 55, "b" should read -- $b$ --.

Column 13,
Line 22, "$E_{RAT-10}20$" should read -- $E_{RAT-10}=20$ --.

Signed and Sealed this

Tenth Day of January, 2006

JON W. DUDAS
*Director of the United States Patent and Trademark Office*